US010642587B2

(12) United States Patent
Ido et al.

(10) Patent No.: US 10,642,587 B2
(45) Date of Patent: May 5, 2020

(54) TECHNOLOGIES FOR INDIRECTLY CALLING VECTOR FUNCTIONS

(71) Applicant: INTEL CORPORATION, Santa Clara, CA (US)

(72) Inventors: Hideki Saito Ido, Sunnyvale, CA (US); Serge V. Preis, Novosibirsk (RU); Sergey S. Kozhukhov, Novosibirsk (RU); Xinmin Tian, Union City, CA (US); Sergey V. Maslov, Berdsk (RU); Clark Nelson, Hillsboro, OR (US); Jianfei Yu, Lake Osego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/076,735

(22) PCT Filed: Mar. 11, 2016

(86) PCT No.: PCT/IB2016/000404
§ 371 (c)(1),
(2) Date: Aug. 9, 2018

(87) PCT Pub. No.: WO2017/153796
PCT Pub. Date: Sep. 14, 2017

(65) Prior Publication Data
US 2019/0050212 A1 Feb. 14, 2019

(51) Int. Cl.
*G06F 9/44* (2018.01)
*G06F 8/41* (2018.01)

(52) U.S. Cl.
CPC ............ *G06F 8/445* (2013.01); *G06F 8/4441* (2013.01)

(58) Field of Classification Search
CPC ..... G06F 8/20; G06F 8/30; G06F 8/31; G06F 8/34; G06F 9/4443
USPC .......................................................... 717/117
See application file for complete search history.

(56) References Cited

U.S. PATENT DOCUMENTS

2013/0079466 A1   3/2013   Kaneumi et al.
2013/0263093 A1*  10/2013  Brandt ................ G06F 11/3466
                                                   717/128

OTHER PUBLICATIONS

PCT Search Report and Written Opinion prepared for PCT/IB2016/000404, completed May 31, 2016.

* cited by examiner

*Primary Examiner* — Chuck O Kendall
(74) *Attorney, Agent, or Firm* — Barnes & Thornburg LLP

(57) ABSTRACT

Technologies for indirectly calling vector functions include a compute device that includes a memory device to store source code and a compiler module. The compiler module is to identify a set of declarations of vector variants for scalar functions in the source code, generate a vector variant address map for each set of vector variants, generate an offset map for each scalar function, and identify, in the source code, an indirect call to the scalar functions, wherein the indirect call is to be vectorized. The compiler module is also to determine, based on a context of the indirect call, a vector variant to be called and store, in object code and in association with the indirect call, an offset into one of the vector variant address maps based on (i) the determined vector variant to be called and (ii) the offset map that corresponds to each scalar function.

25 Claims, 11 Drawing Sheets

```
__declspec(vector(mask))        //create one variant
__declspec(vector(linear(x))) //creates two variants, mask and nomask
int foo1(int x);
```
802

```
__declspec(vector(mask))        //create one variant
__declspec(vector(linear(x))) //creates two variants, mask and nomask
int foo2(int x);
```
804

FIG. 8

```
typedef int
__declspec(vector(mask))        //create one variant
__declspec(vector(linear(x))) //creates two variants, mask and nomask
(*foop)(int);
foop fooptr[N];
```
902

FIG. 9

```
for(int i=0;i<N;i++) {
      fooptr[i] = (i & 1) ? foo2()  foo1();
}
```
1002

```
for (int i; i<N; i++) {
      A[i] = (fooptr[i]) (i);
}
```
1004

FIG. 10

(fooptr[i], fooptr[i+1], fooptr[i+2], fooptr[i+3])     ← 1202

```
class A {
  __declspec(vector(linear(x)))
  virtual int foo0(int x);                ← 1302
  __declspec(vector(linear(x)))
  virtual int foo1(int x);
  virtual int foo2(int x);
  virtual int foo3(int x);
};
class B   public A {    // derived
  virtual int foo0(int x);// override     ← 1304
  virtual int foo2(int x);// override
  __declspec(vector(linear(x)))
  virtual int foo4(int x);// new
};
.
A a; // An instance of A defined.
B b; // An instance of B defined.        ← 1306
A *ap[N] = {&a,&b,&a,&b,...};
for(i){
  ap[i]->foo0(i); ap[i]->foo1(i); ...
}
```

FIG. 13

TECHNOLOGIES FOR INDIRECTLY CALLING VECTOR FUNCTIONS

CROSS REFERENCE TO RELATED APPLICATIONS

The present application claims priority to and is a national stage entry under 35 USC § 371(b) of International Application No. PCT/IB2016/000404, which was filed Mar. 11, 2016, entitled "TECHNOLOGIES FOR INDIRECTLY CALLING VECTOR FUNCTIONS."

BACKGROUND

Explicit vector programming has become one of the most effective methods to access the full processing capabilities of single instruction, multiple data (SIMD) computer architectures. Some optimizing compilers may analyze source code to identify a loop of scalar functions and vectorize the loop such that, when the resulting executable code is executed by a compute device, multiple iterations of the loop are performed concurrently by the compute device, even in the presence of function calls inside the loop. The above process works when the identities of the functions in the loop can be determined at compile time. However, some programming languages, such as C and C++, enable indirect calls to functions, such that the identities of the functions are not defined until run time. Known compilers do not vectorize these indirect function calls. Rather, they cause each scalar function to be called sequentially and do not take advantage of the concurrent processing capabilities of the compute device in these cases.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 8 is an illustration of example source code including declarations of vector variants of scalar functions that may be analyzed by the compute device of FIG. 1;

FIG. 9 is an illustration of example source code including a declaration of a vector of function pointers that may be analyzed by the compute device of FIG. 1;

FIG. 10 is an illustration of example source code to initialize the vector of function pointers of FIG. 9 and to call each function referenced in the vector;

FIG. 12 is an illustration of data values in the vector of function pointers of FIGS. 9-11 as the function pointers are mapped to corresponding vector variants;

FIG. 13 is an illustration of example source code in which a vector of function pointers associated with a parent class and a child class.

DETAILED DESCRIPTION OF THE DRAWINGS

Figure 1:
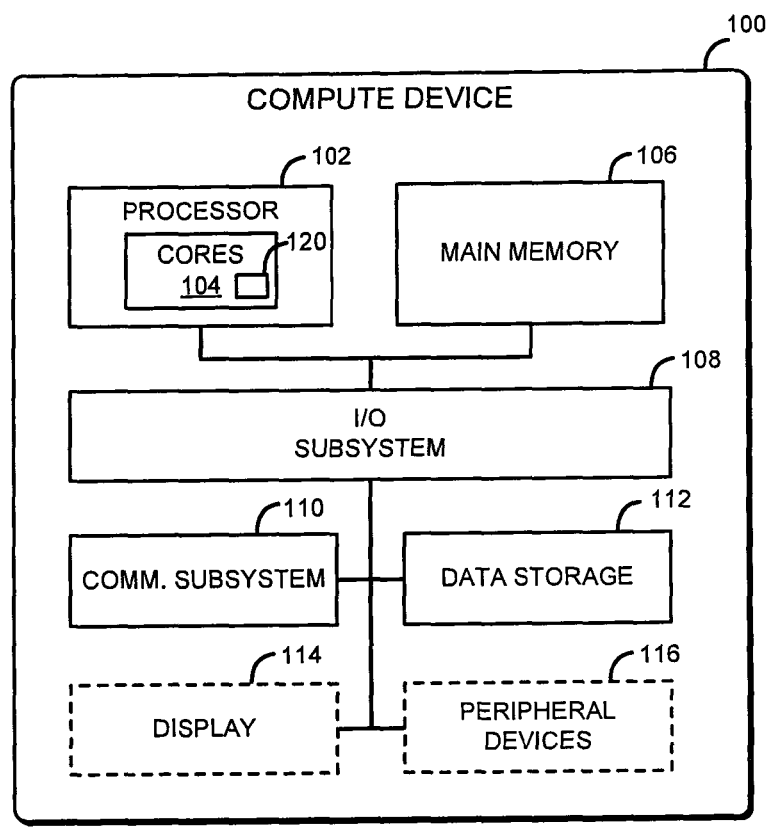
FIG. 1 is a simplified block diagram of at least one embodiment of a compute device for indirectly calling vector functions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 for indirectly calling vector functions includes a processor 102 with one or more cores 104 and a memory 106. One or more of the cores 104 may include a single instruction, multiple data (SIMD) unit 120 to execute vectorized functions, as described in more detail herein. In use, as described in more detail herein, the compute device 100 is configured to indirectly call vector functions. The illustrative compute device 100 may analyze and compile source code that includes a vector of pointers to scalar functions and generate maps, at compile time, that enable the pointers to be deterministically mapped to vector variants of the scalar functions at run time. Accordingly, the overhead that is usually incurred at run time to resolve indirect function calls is reduced, and indirect function calls may be efficiently vectorized, rather than executed sequentially.

The compute device 100 may be embodied as any type of compute device capable of performing the functions described herein. For example, in some embodiments, the compute device 100 may be embodied as, without limitation, a computer, a desktop computer, a workstation, a server computer, a laptop computer, a notebook computer, a tablet computer, a smartphone, a distributed computing system, a multiprocessor system, a consumer electronic device, a smart appliance, and/or any other computing device capable of indirectly calling vector functions. As shown in FIG. 1, the illustrative compute device 100 includes the processor 102, the memory 106, an input/output subsystem 108, a communication subsystem 110, a data storage device 112, and a display 114. Of course, the compute device 100 may include other or additional components, such as those commonly found in a desktop computer (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s) having one or more processor cores 104, a digital signal processor, a microcontroller, or other processor or processing/controlling circuit. The processor may include vector support, which may be embodied as an instruction set architecture extension such as Intel® Advanced Vector Extensions 2 (Intel® AVX2), Intel® Advanced Vector Extensions (Intel® AVX), Intel® MMX, Single Instruction Multiple Data (SIMD) instructions, or other vector extensions available with the processor 102. In the illustrative embodiment, one or more of the cores 104 of the processor include an SIMD unit 120 to provide vector support.

Similarly, the memory 106 may be embodied as any type of volatile or non-volatile memory or data storage currently known or developed in the future and capable of performing the functions described herein. In operation, the memory 106 may store various data and software used during operation of the compute device 100 such as operating systems, applications, programs, libraries, and drivers. The memory 106 is communicatively coupled to the processor 102 via the I/O subsystem 108, which may be embodied as circuitry and/or components to facilitate input/output operations with the processor 102, the memory 106, and other components of the compute device 100. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 102, the memory 106, and other components of the compute device 100, on a single integrated circuit chip.

The illustrative compute device 100 additionally includes the communication subsystem 110. The communication subsystem 110 may be embodied as one or more devices and/or circuitry for enabling communications with one or more remote devices over a network. The communication subsystem 110 may be configured to use any suitable communication protocol to communicate with other devices including, for example, wired data communication protocols, wireless data communication protocols, and/or cellular communication protocols.

The illustrative compute device 100 may also include a data storage device 112. The data storage device 112 may be embodied as any type of device or devices configured for short-term or long-term storage of data such as, for example, memory devices and circuits, memory cards, hard disk drives, solid-state drives, or other data storage devices. The data storage device 112 may store source code, object code (i.e., executable code), and/or other data, such as memory address maps, as described in more detail herein.

The illustrative compute device 100 may also include a display 114, which may be embodied as any type of display on which information may be displayed to a user of the compute device 100. The display 114 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 114 may include a touchscreen sensor that uses any suitable touchscreen input technology to detect the user's tactile selection of information displayed on the display 114 including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

In some embodiments, the compute device 100 may further include one or more peripheral devices 116. Such peripheral devices 116 may include any type of peripheral device commonly found in a compute device such as speakers, a mouse, a keyboard, and/or other input/output devices, interface devices, and/or other peripheral devices.

Figure 2:
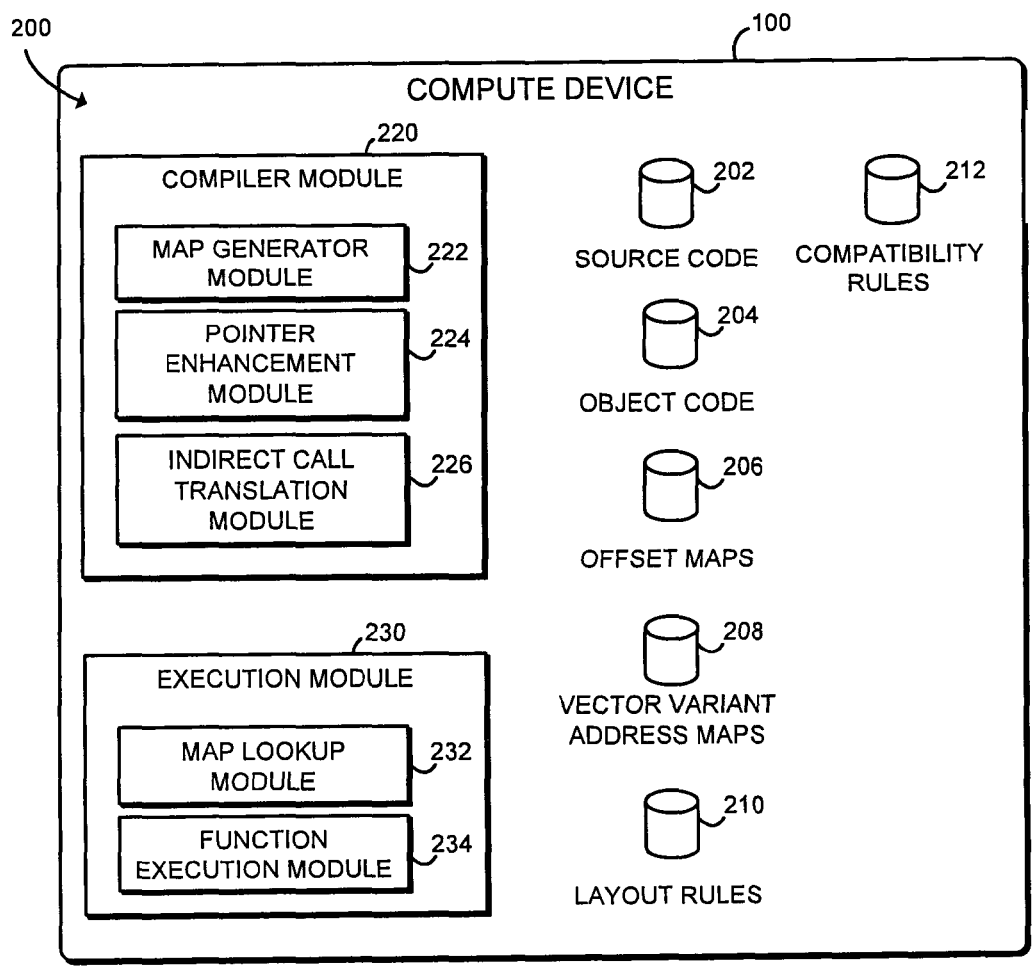
FIG. 2 is a simplified block diagram of at least one embodiment of an environment that may be established by the compute device of FIG. 1.

Referring now to FIG. 2, in the illustrative embodiment, the compute device 100 establishes an environment 200 during operation. The illustrative environment 200 includes a compiler module 220 and an execution module 230. Each of the modules, logic, and other components of the environment 200 may be embodied as hardware, firmware, software, or a combination thereof. As such, in some embodiments, one or more of the modules of the environment 200 may be embodied as circuitry or collection of electrical devices (e.g., compiler circuitry 220, execution circuitry 230, etc.). It should be appreciated that, in such embodiments, one or more of the compiler circuitry 220 and the execution circuitry 230 may form a portion of one or more of the processor 102, the I/O subsystem 108, and/or other components of the compute device 100. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. In the illustrative environment 200, the compute device 100 includes source code 202, object code 204, offset maps 206, vector variant address maps 208, layout rules 210, and compatibility rules 212 each of which may be accessed by the various modules and/or sub-modules of the compute device 100. It should be appreciated that the compute device 100 may include other components, sub-components, modules, sub-modules, and/or devices commonly found in a compute device, which are not illustrated in FIG. 2 for clarity of the description.

The compiler module 220, which may be embodied as hardware, firmware, software, virtualized hardware, emulated architecture, and/or a combination thereof as discussed above, is configured to compile the source code 202 into object code 204 in which loops of indirect function calls are vectorized. To do so, the compiler module 220 includes a map generator module 222, a pointer enhancement module 224, and an indirect call translation module 226. In the illustrative embodiment, the map generator module 222 is configured to generate the offset maps 206 and the vector variant address maps 208 based on the source code 202. As described in more detail herein, for a given scalar function or a pointer to a scalar function, the layout rules 210 and a set of vector variants results in an offset map 206. For a scalar function, the offset map 206 is also used in creating the vector variant address map 208. In some embodiments, the offset map 206 may be embodied in another form, other than a map, such as a table. Each vector variant address map 208 includes addresses of vector variants of corresponding scalar functions declared in the source code 202. Some embodiments may also use vector variant address maps 208 for function pointers. Such vector variant address maps for function pointers may be updated as a result of function pointer assignment in the source code 202. In the object code 204, such an update may be represented by translating the contents from one map to form the contents of another. Each offset map 206 includes offsets into the associated vector variant address map 208. In the illustrative embodiment, each offset in one of the offset maps 206 refers to a different one of the vector variant addresses. For example, a vector variant address map 208 may include the addresses of three vector variants of a scalar function. The vector variant addresses are arranged in the vector variant address map 208 according to the layout rules 210. The layout rules 210 may specify that the addresses of the vector variants are to be ordered based on the alphabetical order of the names of vector variants, or based on other criteria. Each offset map 206 includes the offsets into the corresponding vector variant address map 208 for a particular set of vector variants.

As described herein, in some embodiments, such as when child classes have different implementations of a virtual function, two or more scalar functions may not have matching sets of vector variants. For example, one scalar function may have a subset or a superset of the vector variants associated with another scalar function, such that, at run time, when a vector variant address map 208 for each of the scalar functions is populated, an offset into one of the vector variant address maps 208 may lead to a null address (i.e., a missing vector variant), while the same offset into another vector variant address map 208 for another scalar function of a similar type does resolve to an existing vector variant of the scalar function. When the vector variant does not exist (i.e., the vector variant address map 208 does not include a vector variant address at a given offset), as described in more detail herein, the compute device 100 may operate in a non-vectorized mode by sequentially executing the scalar function for each iteration of a loop. As will be appreciated by those skilled in the art, the compute device 100 may use a virtual function table to determine an address of a function associated with a child class that overrides a virtual function of a parent class. In some embodiments, one or more of the vector variant address maps 208 may be embodied as a virtual function table or as an extension of a virtual function table. For example, if a scalar function has three vector variants, the addresses to the entry points of each of the three vector variants may be stored in the vector variant address map 208 and the offsets (i.e., indexes) into the vector variant address map 208 for the vector variants are stored in the offset map 206. By generating these maps 206, 208 at compile time, the map generator module 222 enables the indirect function calls to be vectorized and efficiently executed at run time.

The pointer enhancement module 224 determines, at compile time, which of the vector variants a particular function pointer resolves to, based on a context (e.g., progression of values for each parameter, length of the vector, target architecture, etc.) of the indirect function call in the source code, extracts the offset of the particular vector variant from the offset map 206 in association with the set of vector variants available for the pointer, and embeds the offset in the object code 204. As described in more detail herein, the above scheme works because the layout rule 210 enforces a deterministic map layout for a given set of vector variants, such that while the particular scalar function that a pointer points to is unknown at compile time, the vector variant address maps 208 associated with scalar functions and function pointers with identical sets of vector variants will have a similar layout. The indirect call translation module 226 is configured to translate function pointer assignments in the source code 202 into the object code 204. In analyzing function pointer assignments, the indirect call translation module 226 may be configured to access the compatibility rules 212, which define actions to be taken by the indirect call translation module 226 to translate function pointer assignments under various scenarios, as described herein. Some embodiments may require two function pointers, or addresses of scalar functions, to have identical sets of vector variants in order to be compatible for assignment. In such embodiments, translation of function pointer assignment in the source code 202 into object code 204 can be performed by a pointer copy. Other embodiments may allow an assignment between two function pointers with different sets of vector variants at the source code 202 level. In such embodiments, function pointer assignment translation into the object code 204 may involve translation from one vector variant address map to another vector variant address map to be executed at run time. Accordingly, the offset stored in association with each function pointer (i.e., at the call site, where the function pointers are used) will be correct for its set of vector variants, regardless of which scalar function the pointer points to. In some embodiments, the pointer may point to the vector variant address map which points to the scalar function and its vector variants. It should be appreciated that each of the map generator module 222, the pointer enhancement module 224, and the indirect call translation module 226 of the compiler module 220 may be separately embodied as hardware, firmware, software, virtualized hardware, emulated architecture, and/or a combination thereof. For example, the map generator module 222 may be embodied as a hardware component, while the pointer enhancement module 224 and the indirect call translation module 226 are embodied as a virtualized hardware component or as some other combination of hardware, firmware, software, virtualized hardware, emulated architecture, and/or a combination thereof.

The execution module 230, which may be embodied as hardware, firmware, software, virtualized hardware, emulated architecture, and/or a combination thereof as discussed above, is configured to execute the object code 204 generated by the compiler module 220. In the illustrative embodiment, the execution module 230 may be configured to execute indirectly called vector functions. To do so, the illustrative embodiment of the execution module 230 includes a map lookup module 232 and a function execution module 234. In the illustrative embodiment, the map lookup module 232 is configured to load a vector of pointers to scalar functions, based on the object code 204. Additionally, the map lookup module 232 may be configured to identify the vector variant address map 208 to use for each pointer in the vector. In other embodiments, the map lookup module 232 may be configured to load a vector of vector variant address maps 208 or a vector of pointers to vector variant address maps 208. Further, the map lookup module 232 may be configured to identify the offset stored in association with an indirect call that uses the pointers, based on the object code 204, and determine an address of each associated vector variant to be called. In the illustrative embodiment, the map lookup module 232 is configured to determine the address of the vector variant to be called, based on the offset stored in association with the function call and based on the identified vector variant address map. For example, in the illustrative embodiment, the map lookup module 232 may identify an offset stored in association with a call that uses a pointer to a scalar function, determine the appropriate vector variant address map to use, based on the scalar function that the pointer points to, and look up the address of the vector variant to be called, based on the offset.

In the illustrative embodiment, the function execution module 234 is configured to execute the vector variants whose addresses were resolved by the map lookup module 232, as described above. It should be appreciated that each of the map lookup module 232 and the function execution module 234 of the execution module 230 may be separately embodied as hardware, firmware, software, virtualized hardware, emulated architecture, and/or a combination thereof. For example, the map lookup module 232 may be embodied as a hardware component, while the function execution module 234 is embodied as a virtualized hardware component or as some other combination of hardware, firmware, software, virtualized hardware, emulated architecture, and/or a combination thereof.

Figure 3:
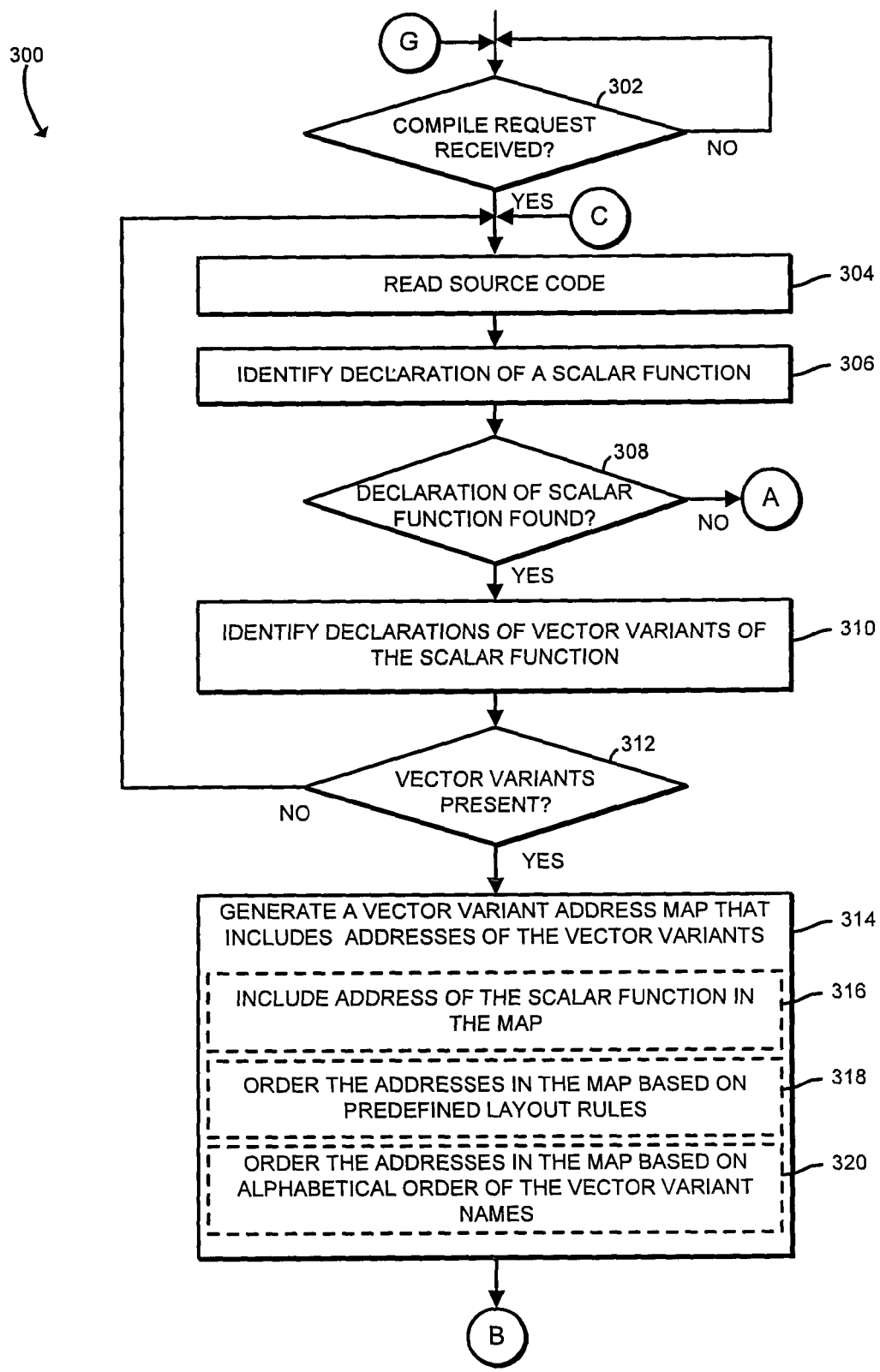
FIGS. 3-6 are a simplified flow diagram of at least one embodiment of a method for compiling source code to vectorize indirect function calls that may be performed by the compute device of FIG. 1.

Referring now to FIG. 3, in use, the compute device 100 may execute a method 300 for compiling source code, such as the source code 202, to vectorize indirect function calls. The method begins in block 302 in which the compute device 100 monitors for a compile request. The compile request may be issued by an application, such as a software development application, executing on the compute device 100. Alternatively, the compile request may be issued by a build script as part of an installation process for a software package. In other embodiments, the compile request may be issued by a remote compute device (not shown), or by another source. Regardless, if the compute device 100 receives the compile request, the method 300 advances to block 304 in which the compute device 100 reads the source code 202. In the illustrative embodiment, the compute device 100 may read the source code 202 from the memory 106. The source code 202 may have been loaded into memory 106 from the data storage 112. In some embodiments, the source code 202 may have been generated on the compute device 100, such as in a software development application, received from a remote compute device (not shown) using the communication subsystem 110, or accessed from another source.

In block 306, the compute device 100 identifies a declaration of a scalar function in the source code 202. The declaration of the scalar function indicates the existence of the function in the source code and provides information about the types of data used by the function. In the illustrative embodiment, the declaration of the scalar function defines the name of the function, one or more data types that are to be passed to the scalar function when the scalar function is called, and the type of data, if any, that the scalar function returns. As described in more detail herein, a declaration of a scalar function may be accompanied by declarations of vector variants of the scalar function. While the scalar function is designed to be executed independently, such as once per iteration of a loop, the vector variants of the scalar function are designed to be executed in parallel, such that multiple vector variants concurrently operate on data associated with different iterations of the loop. The data associated with the various iterations of the loop may be organized in a vector. As described in more detail herein, the compute device 100 may identify a loop that calls the scalar function, determine that the target computer architecture supports vectorization, and replace multiple iterations of the loop to fewer iterations of a vectorized loop that calls multiple vector variants of the scalar function in parallel.

In block 308, the compute device 100 determines whether a declaration of a scalar function was identified in the source code 202. If not, the method 300 advances to block 326 to identify declarations of pointers to functions in the source code 202, as described in more detail herein. However, if the compute device 100 instead determines that a declaration of a scalar function was identified in the source code 202, then the method 300 advances to block 310, in which the compute device 100 identifies one or more declarations of vector variants of the scalar function. Multiple variants of the vector function may be associated with a particular scalar function. For example, each variant may be designed to be executed for a different context (e.g., conditionally, unconditionally, progression patterns of values for each parameter, the length of the vector, and/or the target computer architecture). Each vector variant declaration defines the context that the particular vector variant was designed for. As described in more detail herein, the compute device 100 may determine the appropriate context for a vector variant of a scalar function at compile time, rather than at run time.

In block 312, the compute device 100 determines whether declarations of vector variants of the scalar function are present in the source code 202. If not, the method 300 loops back to block 304 to read the source code 202 further and potentially identify another scalar function declaration. However, if the compute device 100 determines that vector variant declarations are present in the source code 202, then the method 300 advances to block 314, in which the compute device 100 generates a vector variant address map 208 that includes addresses of the vector variants. In the illustrative embodiment, each address is embodied as a location of the beginning (e.g., small constant offset from the first instruction) of the corresponding function. In generating the vector variant address map 208, the compute device 100 may include an address of the corresponding scalar function, as indicated in block 316. For example, in the illustrative embodiment, the compute device 100 may include the address of the scalar function as the first entry in the vector variant address map 208 and then follow the address of the scalar function with addresses of the associated vector variants. As indicated in block 318, the illustrative compute device 100 orders the vector variant addresses within the vector variant address map 208 based on the predefined layout rules 210. The layout rules 210 may define an order for the addresses of the vector variants based on one or more criteria, such as the names of the vector variants, the context for which each vector variant was designed, and/or other criteria. In some embodiments, as indicated in block 320, the compute device 100 may order the addresses in the vector variant address map 208 based on the alphabetical order of the vector variant address names (e.g., alphabetically ascending order or alphabetically descending order). As should be appreciated, the ordering scheme should be substantially identical between two scalar functions, between two function pointers, or between a scalar function and a function pointer if they have identical sets of vector variants.

Figure 4:
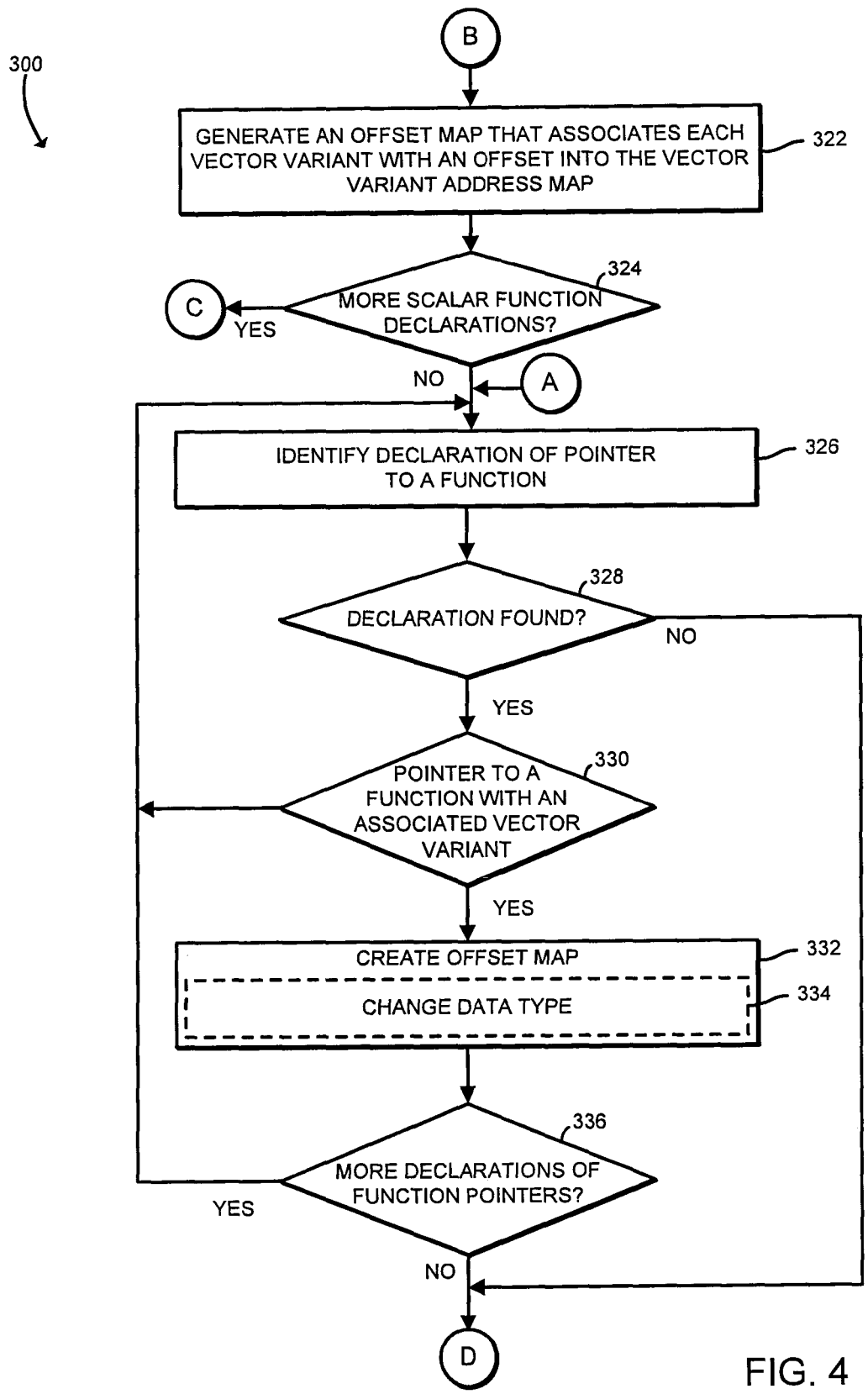

In block 322 of FIG. 4, the compute device 100 generates the offset map 206, which associates each vector variant with an offset in to the corresponding vector variant address map 208. In other words, the offset map 206 specifies, for a given vector variant function to be called, where to look in the vector variant address map 208 to find the vector variant's address. As described above, the address of a vector variant provides the location of the start of the function body (e.g., the first instruction) of the vector variant. In the illustrative embodiment, the offset map 206 may be organized as a series of entries, wherein each entry includes an identifier of a vector variant, such as the name of the vector variant, followed by the offset (i.e., index) into the vector variant address map 208 where the address of that vector variant can be found. In some embodiments, the offset map 206 may be created for each particular set of vector variants and organized as a series of entries, wherein each entry is an offset for a particular variant in the set. The offset maps 206 may be embodied as hardware, firmware, software, virtualized hardware, emulated architecture, and/or a combination thereof. In block 324, the compute device 100 determines whether to analyze the source code 202 for more scalar function declarations. For example, in the illustrative embodiment, if the compute device 100 has not yet analyzed the entire source code 202, the compute device 100 may determine that more scalar functions may exist. If so, the method loops back to block 304 to read the source code 202 further and identify a declaration of another scalar function. For example, in the illustrative embodiment, the compute device 100 may identify and analyze two or more scalar function declarations and their associated vector variants, and generate the corresponding offset maps 206 and vector variant address maps 208. In the illustrative embodiment, the identified scalar functions have the same types of vector variants.

In block 326, the compute device 100 analyzes the source code 202 to identify a declaration of a pointer to a function. In block 328, the compute device 100 determines whether a declaration was found in the source code 202. If not, the method 300 advances to block 338 of FIG. 5, to identify an assignment to a pointer to a function, as described in more detail herein. Otherwise, the method 300 advances to block 330, in which the compute device 100 determines whether the pointer to the function identified in block 326 was declared in the source code 202 as a pointer to a function that has an associated vector variant. If not, the method 300 loops back to block 326 to identify another declaration of a pointer to a function. However, if the compute device 100 does determine that the pointer to the function identified in block 326 is a pointer to a function that has an associated vector variant, the method 300 advances to block 332. In block 332, the illustrative compute device 100 creates the offset map 206 for the pointer to the function, using a process similar to that described above in blocks 314 through 322. In other embodiments, the compute device 100 defers the creation of the offset map 206 until a later time. Additionally, as indicated in block 334, in some embodiments, the compute device 100 may change the data type from "pointer to function" to "vector variant mapping table", to "pointer to vector variant mapping table", or a similar data type, while other embodiments of the compute device 100 may keep the data type as "pointer to function". In block 336, the compute device 100 determines whether to analyze the source code 202 for more declarations of function pointers. If so, the method 300 loops back to block 326 to analyze the source code 202 to identify a declaration of another pointer to a function. Otherwise, the method 300 advances to block 338 of FIG. 5, in which the compute device 100 analyzes the source code 202 to identify an assignment to a pointer to a function.

Figure 5:
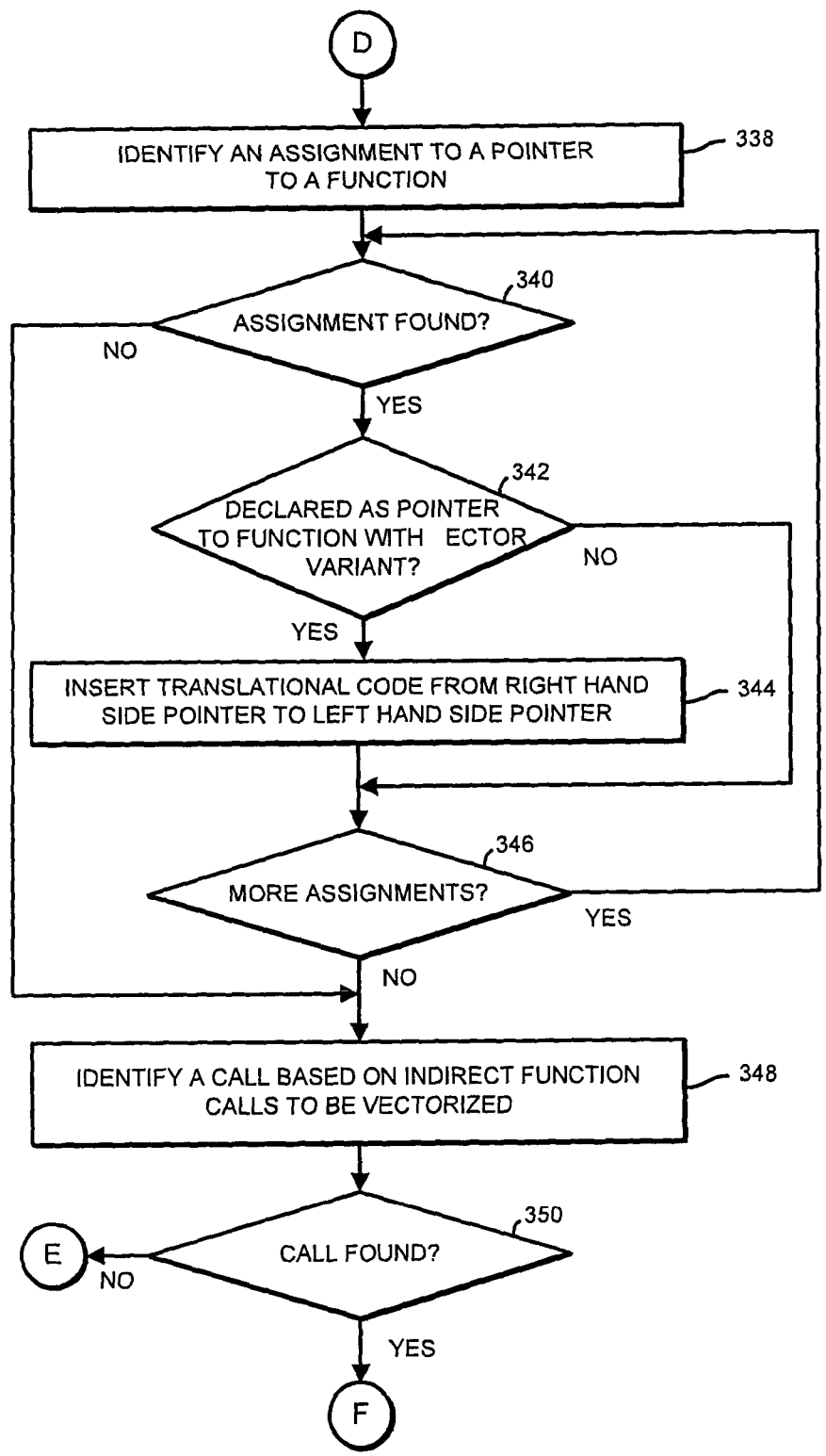

In block 340 of FIG. 5, the compute device 100 determines whether such an assignment was found in the source code 202. If not, the method 300 advances to block 348 in which the compute device 100 analyzes the source code 202 to identify a call based on indirect function calls to be vectorized. Otherwise, the method 300 advances to block 342 in which the compute device 100 determines whether the pointer to the function identified in block 338 was declared in the source code 202 as a pointer to a function that has an associated vector variant. If not, the method 300 advances to block 346, in which the compute device 100 determines whether to analyze the source code 202 for more assignments. Otherwise, the method 300 advances to block 344, in which the compute device 100 inserts translational code for the assignment operation. For example, the compute device 100 may insert translation code to handle the assignment from a right hand side pointer to a left hand side pointer of the assignment operation. In some embodiments, the inserted translation code may copy the pointer from the right hand side to the left hand side. In some embodiments, the translation code causes a left hand side table creation from a right hand side table. The representation of the pointer to a function with a vector variant may be a pointer to a table or it could be a table itself. In block 346, the compute device 100 determines whether to analyze the source code 202 for more assignments. If so, the method 300 loops back to block 340 to identify more assignments. Otherwise, for example if the compute device 100 has identified all of the assignments of pointers to functions in the source code, the method 300 advances to block 348.

Figure 6:
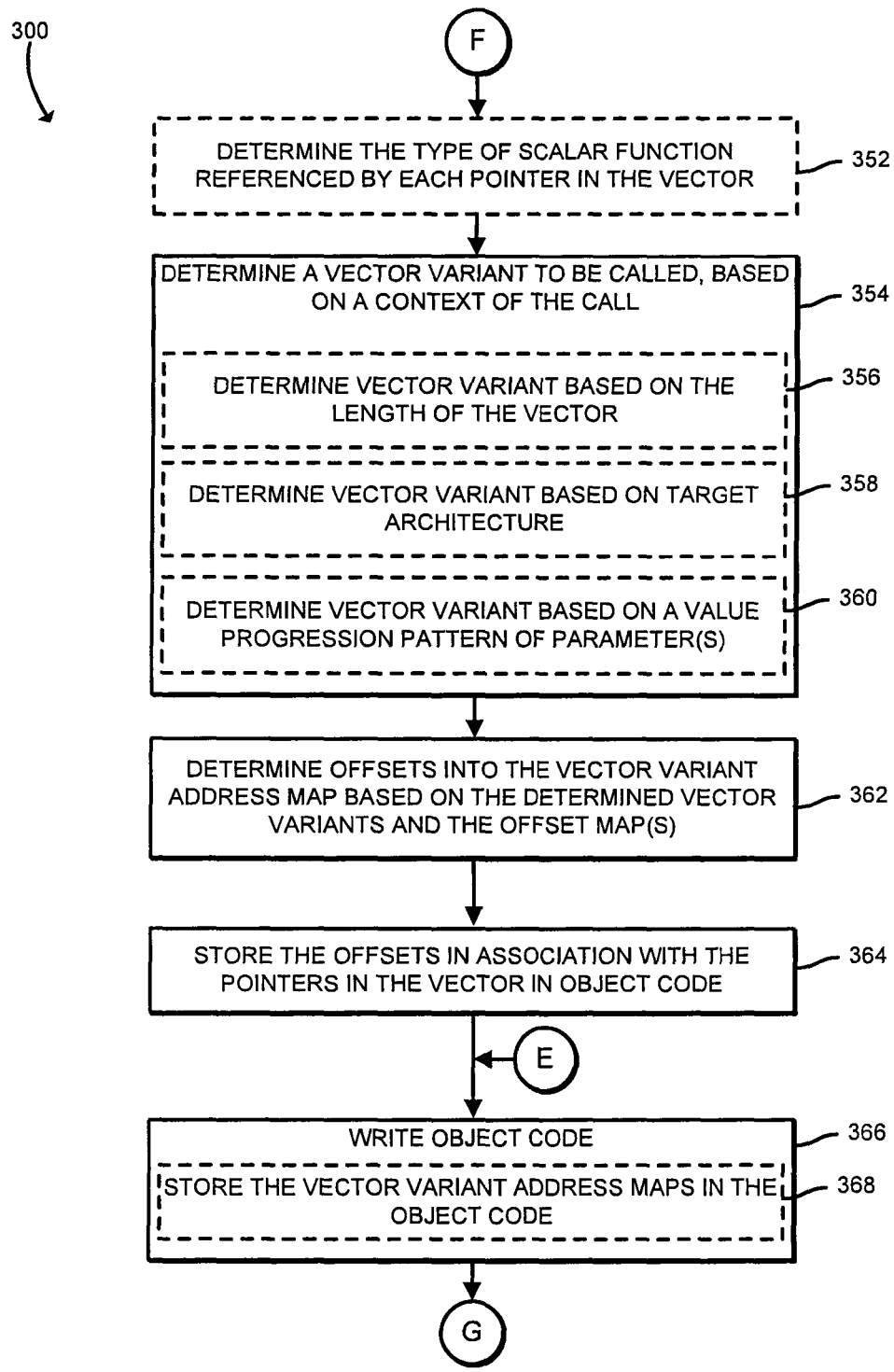

In block 348, the compute device 100 attempts to identify a call in the source code 202 based on a vector of pointers to a scalar function, a virtual function, or any other type of indirect function calls, to be vectorized by explicit vectorization or auto-vectorization. In block 350, the compute device 100 determines whether such a call was found in the source code 202. If not, the method 300 advances to block 366 of FIG. 6 to generate the object code 204 as described in more detail herein. However, if the compute device 100 determines that such a call was found in the source code 202, the method 300 advances to block 352 of FIG. 5, in which the compute device 100 may determine the types, but not the exact identities, of the scalar functions referenced by each pointer in the vector. For example, the compute device 100 may determine that the pointers are pointers to one or more of the scalar functions for which the compute device 100 generated corresponding offset maps 206 and vector variant address maps 208. As described above, a call based on a pointer to a function is an indirect call, as distinguished from a call that specifies the exact function to be executed. In the illustrative embodiment, each pointer in the vector of pointers points to one of the declared scalar functions, but the particular one of the scalar functions pointed to by each pointer is not defined until run time. In some embodiments, each pointer in the vector of pointers points to one of the vector variant address maps 208, but the particular one of the vector variant address maps 208 pointed to by each pointer is not defined until run time. Each pointer at the source code 202 level may be embodied as the vector variant address map 208 in the object code 204 level.

In block 354, the compute device 100 determines a vector variant to be called for the vector of pointers, based on the context of the call. In some embodiments, the compute device 100 may determine the vector variant to be called based on the length of the vector, as indicated in block 356. Additionally or alternatively, the compute device 100 may determine the vector variant to be called based on the target computer architecture for the object code 204, as indicated in block 358. Additionally or alternatively, the compute device 100 may determine the vector variant to be called based on a value progression pattern (e.g., uniform, linear, linear step amount, or no apparent progression rules) of each parameter to be passed in, as indicated in block 360. In other embodiments, other aspects associated with the function call may be used as criteria for determining the vector variant to be called.

In block 362, the compute device 100 determines offsets into the vector variant address map based on the determined vector variants to be called, and based on the offset maps 206 generated earlier. As described above, the exact identity of a scalar function referenced by a given pointer is unknown at compile time. Accordingly, the appropriate vector variant address map 208 to be used is also unknown at compile time. However, given that the pointers in the vector of pointers have the same types of vector variants associated with them, and the layout rules 210 cause the vector variant address maps 208 to be organized in the same way, the compute device 100 is able to determine the offset to be used in association with the indirect function call. For example, if the context of the indirect function call is "context B" and the layout rules 210 cause the address for the vector variant associated with "context B" to be the second entry in the vector variant address map 208, then the compute device 100 may access the offset map 206 to look up the offset into the vector variant address map 208 for the second entry. In block 364, the compute device 100 stores the determined offsets in association with the indirect call, which uses the vector of pointers. In the illustrative embodiment, the compute device 100 stores the offsets in the object code 204 in association with the vector. In block 366, the compute device 100 writes the object code 204. In the illustrative embodiment, the compute device 100 may store the vector variant address maps 208 in the object code 204, as indicated in block 368. Additionally or alternatively, the compute device 100 may store the offset maps 206 in the object code 204. The method 300 then loops back to block 302 to await another compile request.

Figure 7:
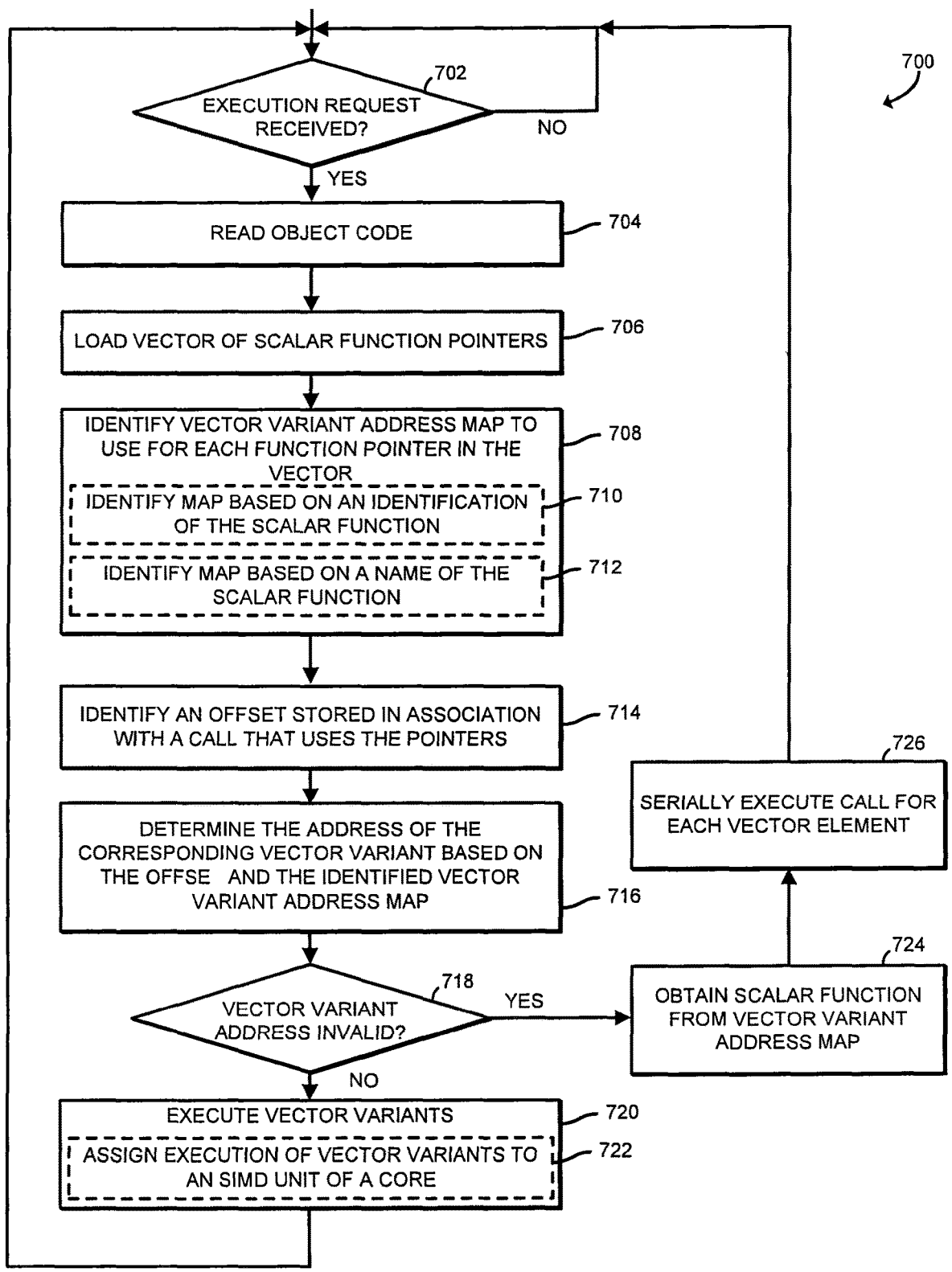
FIG. 7 is a simplified flow diagram of at least one embodiment of a method for executing object code containing a vector of indirect function calls that may be performed by the compute device of FIG. 1.

Referring now to FIG. 7, in use, the compute device 100 may execute a method 700 for executing the object code 204 containing a vector of indirect function calls. The method begins in block 702 in which the compute device 100 monitors for an execution request. The execution request may be issued by an operating system executing on the compute device 100, by a remote compute device (not shown), or by another source. Regardless, if the compute device 100 determines that an execution request has been received, the method 700 advances to block 704, in which the compute device 100 reads the object code 204. In the illustrative embodiment, the compute device 100 may read the object code 204 from the memory 106. In some embodiments, the object code 204 may have been loaded into memory 106 from the data storage 112. Additionally or alternatively, the object code 204 may have been received from a remote compute device (not shown) or from another source. In block 706, the compute device 100 loads a vector of scalar function pointers. However, it should be appreciated that the compute device 100 may, in some instances, determine that all elements in such a vector of pointers have identical values and thus can generate code to load one scalar function pointer to be used by all elements of the vector. In block 708, the compute device 100 identifies the vector variant address map 208 to use for each function pointer in the vector. Additionally or alternatively to the blocks 706, 708, the compute device 100 may load a vector of pointers to vector variant address maps or a vector of vector variant address maps.

In the illustrative embodiment, the compute device 100 may identify the vector variant address map 208 based on an identification of the scalar function, as indicated in block 710. As described above, while the exact identity of a scalar function referenced by a function pointer is not defined at compile time, the exact identity is defined at run time (i.e., when the object code is being executed). In some embodiments, the vector variant address map 208 may be accessible directly (e.g., constant offset) from the function pointer. In other embodiments, the compute device 100 may identify the vector variant address map 208 based on the name of the scalar function referenced by the function pointer, as indicated in block 712. For example, the vector variant address map 208 may include the name or the address of the scalar function, to enable the appropriate vector variant address map 208 to be accessed once the identity of the scalar function is resolved (i.e., at run time). In block 714, the compute device 100 identifies the offset stored in association with the call. As described above, with reference to the method 300, the compute device 100 previously computed the offset into the vector variant address map 208 in association with each indirect call during compilation of the source code 202 and stored it in the object code 204. Accordingly, the compute device 100 may access the offset stored in association with each indirect call at run time.

In block 716, the compute device 100 determines the address of the corresponding vector variant based on the offset stored in association with each indirect call and the identified vector variant address maps 208. As described above, having identified the appropriate vector variant address maps 208 in block 708 and having identified the offsets into the vector variant address map in block 714, the compute device 100 may determine the address of the appropriate vector variants to call by reading the vector variant address maps 208 at the offsets. However, in at least some embodiments, the various scalar functions that may be referenced by the pointer may not have matching sets of vector variants. For example, one scalar function may have more vector variants than another scalar function of the same type. Accordingly, the compute device 100 may determine, at run time, that the offset into the vector variant address map 208 leads to a missing vector variant (i.e., no corresponding vector variant has been defined for a particular context for the particular scalar function). In such instances, the compute device 100 may determine, in block 718, that the vector variant address determined in block 716 is invalid (e.g., null). If the compute device 100 determines, in block 718 that the vector variant address is not invalid (i.e., that the address is not null and the corresponding vector variant actually exists), the method 700 advances to block 720 in which the compute device 100 executes the vector variant associated with each function pointer. In doing so, the compute device 100 may assign execution of the vector variant to the single instruction, multiple data (SIMD) unit 120 of one of the cores 104 of the processor 102, as indicated in block 720.

Referring back to block 718, if the compute device 100 instead determines that the vector variant address 718 that was resolved in block 716 is invalid (e.g., null), the method 700 advances to block 724 in which the compute device 100 obtains the scalar function address from the vector variant address map 208. As described above, the vector variant address map 208 may include the address of the scalar function in the vector variant address map 208 at a position according to the layout rules 210, for example as the first entry in the vector variant address map 208. In block 726, the compute device 100 serially executes the call, by executing the scalar function whose address was obtained in block 724, for each vector element.

Referring now to FIG. 8, pseudocode 802 illustrates source code 202 that includes declarations of three vector variants of a scalar function. Specifically, the scalar function is "foo1( )" and the three vector variants are embodied as a mask variant, a linear mask variant, and a linear non-mask variant. Similarly, pseudocode 804, also shown in FIG. 8, illustrates additional source code 202 that includes declarations of additional vector variants of another scalar function, "foo2( )". The three vector variants of the "foo2( )" scalar function are a mask variant, a linear mask variant, and a linear non-mask variant. The pseudocode 802, 804 is representative of source code 202 that the compute device 100 may analyze in the method 300 to generate the vector variant address maps 208 and the offset maps 206.

Referring now to FIG. 9, pseudocode 902 illustrates source code 202 that includes a declaration of a vector of function pointers that the compute device 100 may compile into object code 204. In the pseudocode 902, the function pointer type is referred to as "foop", and the vector, named "fooptr", contains N "foop" function pointers. Each function pointed to by fooptr[ ] elements is expected to have three vector variants: a mask variant, a linear mask variant, and a linear non-mask variant. The pseudocode 902 is also representative of source code 202 that the compute device 100 may analyze in the method 300 to generate the offset maps 206 and the vector variant address maps 208.

Referring now to FIG. 10, pseudocode 1002 illustrates an initialization of the "foop" function pointers in the "fooptr" vector that was declared in the pseudocode 902 of FIG. 9. As shown, odd numbered function pointers in the vector are set to point to the "foo1( )" scalar function of FIG. 8 and the even numbered function pointers in the vector are set to point to the "foo2( )" scalar function of FIG. 8. Further, pseudocode 1004, also shown in FIG. 10, illustrates a loop that sequentially calls each of the functions referenced in the "fooptr" vector. The compute device 100 may vectorize this loop, such that multiple iterations of the loop are executed concurrently, such as by one or more of the SIMD units 120 of the processor 102. The pseudocode of FIGS. 8-10 are representative of source code 202 that the compute device 100 may analyze in the method 300.

For the sake of simplicity, FIGS. 8-10 illustrated examples that use the identical set of vector variants for scalar functions and function pointers. Some embodiments may allow assignment of an address of a scalar function with one set of vector variants into a function pointer with another set of vector variants, or between two function pointers with different sets of vector variants.

Figure 11:
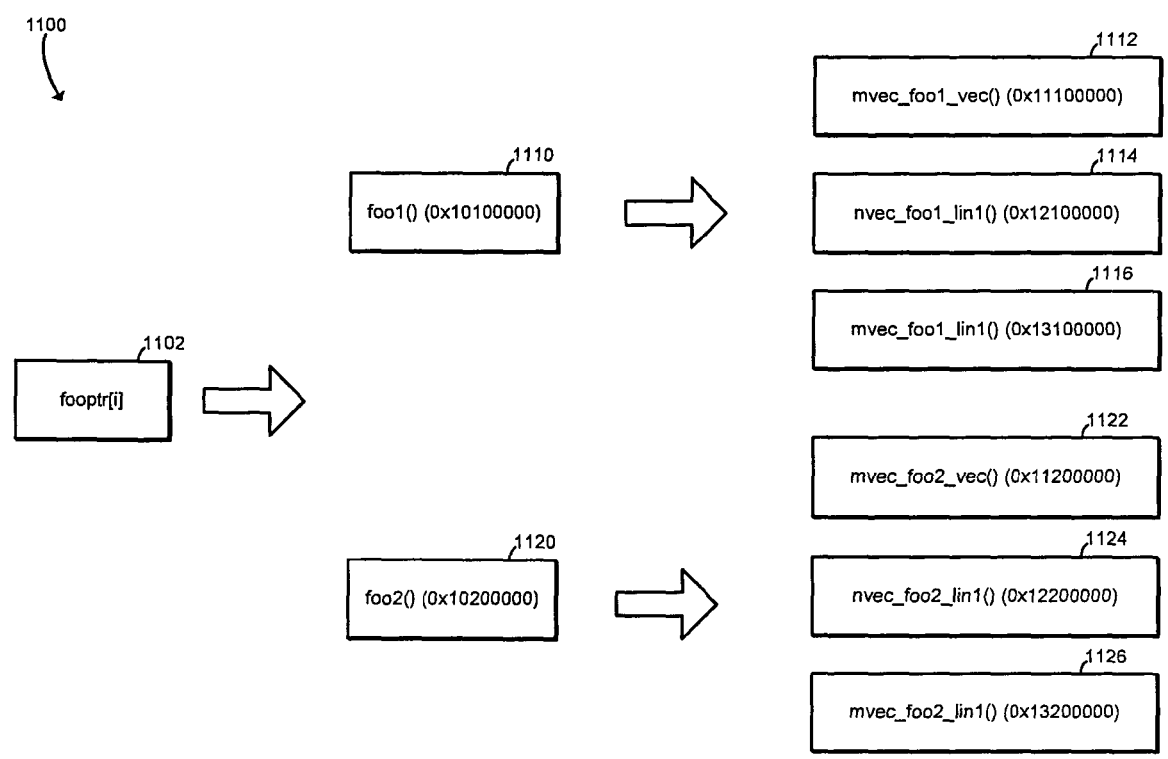
FIG. 11 is a simplified block diagram of a process for mapping between the vector of function pointers of FIG. 9 to vector variants that may be performed by the compute device of FIG. 1.

Referring now to FIG. 11, in use, the illustrative compute device 100 may perform a process 1100 for mapping between the function pointers in the "fooptr" vector and the corresponding vector variants. At run time, the compute device 100 may determine whether the "ith" pointer in the "fooptr" vector points to the "foo1( )" scalar function 1110, which has an address of 0x11110000, or the "foo2( )" scalar function 1120, which has an address of 0x11200000. As described above, the actual value of each function pointer is defined at run time, such as in a loop similar to the loop in the pseudocode 1004 of FIG. 10. Once the compute device 100 has determined which of the scalar functions the function pointer points to, the compute device 100 maps the indirect function call to one of the vector variants associated with the scalar function. In the illustrative embodiment, if the function pointer points to the "foo1( )" scalar function 1110, then the compute device 100 maps the indirect call to one of the mvec_foo1_vec( ) variant 1112, the mvec_foo1_lin1( ) variant 1114, or the mvec_foo1_lin1( ) variant 1116. On the other hand, if the function pointer points to the "foo2( )" scalar function 1120, then the compute device 100 maps the indirect call to one of the mvec_foo2_vec( ) variant 1122, the mvec_foo2_lin1( ) variant 1124, or the mvec_foo2_lin1( ) variant 1126. As described above, the compute device 100 performs the mapping based on the context of the call, determined at compile time. In other words, the compute device 100 uses the offset that was stored in association with the function call compile time, to read the address of the appropriate vector variant from the vector variant address map 208. In the pseudocode 1004, the actual parameter passed to the call is a linear value. The call itself is not under any mask, but the vector of pointers "fooptr[ ]" is likely to contain different values, which the compute device 100 may assume unless it determines otherwise, and thus the execution in block 720 in FIG. 7 would use a masked variant. Therefore, in the illustrative embodiment, the compute device 100 chooses a linear mask variant, and the offset map 206 is referenced to obtain the offset for the linear mask variant. The variants, mvec_foo1_lin1( ) and mvec_foo2_lin1( ), are located at the same offset in the corresponding vector variant address maps 208 for foo1( ) and foo2( ).

Referring now to FIG. 12, in use, the compute device 100 may vectorize the loop from the pseudocode 1004, such that four iterations of the loop are executed concurrently. The four iterations of the loop are illustrated by the pseudocode 1202. Through the mapping process described above with reference to FIG. 11, the compute device 100 may resolve the fooptr[i], fooptr[i+1], and fooptr[i+3] pointers to the "foo1( )" scalar function, which has an address of 0x11110000, as shown in the vector contents 1204. Further, the compute device 100 may resolve the fooptr[i+2] pointer to the "foo2( )" scalar function, which has an address of 0x11200000, as shown in the vector contents 1204. Additionally, the compute device 100 may map each scalar function in the vector contents to one of the vector variants, using the process described above with reference to FIG. 11.

In the illustrative embodiment, the compute device 100 may map the "foo1( )" scalar function pointers to the addresses of the mvec_foo1_lin1( ) vector variant (i.e., 0x14110000), and may map the "foo2( )" scalar function pointer to the address of the mvec_foo2_lin1( ) vector variant (i.e., 0x14200000), as shown in the vector contents 1206.

Figure 14:
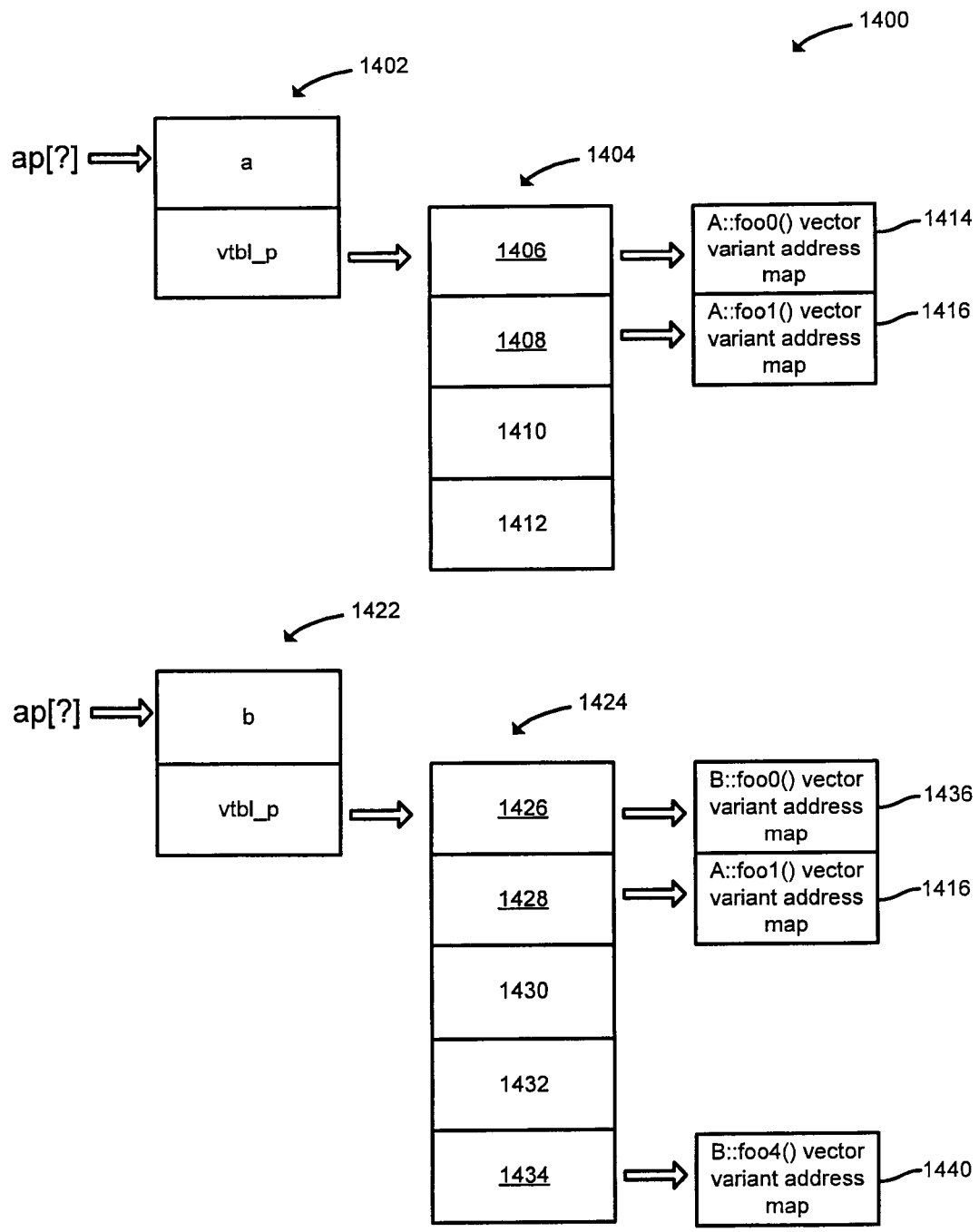
FIG. 14 is a simplified block diagram of a process for mapping the function pointers of FIG. 13 that may be performed by the compute device of FIG. 1.

FIGS. 13-14 illustrate examples when one pointer in a vector resolves to a set of vector variant address maps that do not exactly match the vector variant address maps associated with another pointer in the vector. This may occur with virtual function calls, such as in C++ or other programming languages that allow a child class to override functions of a parent class. This situation may also occur in other instances in which one vector variant address map associated with one scalar function is a superset, a subset, or is otherwise different than another vector variant address map associated with another scalar function in the same vector of pointers. Referring now to FIG. 13, pseudocode 1302 illustrates source code 202 that includes a declaration of a parent class named "class A". The pseudocode 1302 also declares multiple vector variants of various scalar functions, including vector variants of a "foo0( )" scalar function and of a "foo1( )" scalar function. The pseudocode 1302 also declares a "foo2( )" scalar function and a "foo3( )" scalar function that do not have vector variants. Each of the functions declared for "class A" are virtual, meaning they may be overridden in a child class. Pseudocode 1304 illustrates source code 202 that includes a declaration of a child class named "class B" that inherits from "class A" (i.e., the parent class). The pseudocode 1304 includes functions that override corresponding functions in the parent class. In particular, the pseudocode 1304 declares a vector variant that overrides the "foo0( )" function. Additionally, the pseudocode overrides the "foo2( )" scalar function of the parent class. Further, the pseudocode 1304 declares a vector variant of a function that is not present in "class A", namely a vector variant of a "foo4( )" scalar function. The pseudocode 1306 defines an instance of the parent class, "class A", and an instance of the child class, "class B" and initializes a vector of pointers to the parent class, "class A". However, the pseudocode 1306 actually populates the vector with a mixture of pointers, some of which point to the parent class, "class A", while others point to the child class, "class B". Further, the pseudocode 1306 includes a loop in which the member functions of the classes (e.g., "foo0( )", "foo1( )", etc.) are called in a loop that iterates through each pointer in the vector.

Referring now to FIG. 14, the compute device 160 may perform a process 1400 to map the function pointers from the loop in the pseudocode 1306. For one iteration 1402 of the loop, the compute device 100 determines that a pointer in the vector for an instance of the parent class, "class A", actually points to the instance of the parent class, rather than to the instance of the child class, "class B". Further, the compute device 100 resolves a pointer ("vtbl_p") to a virtual function table 1404 for the parent class (i.e., "class A"). The virtual function table 1404 is extended to include an entry 1406 that points to a vector variant address map 1414 for vector variants of the "foo0( )" scalar function of the parent class. The virtual function table 1404 also includes another entry 1408 that points to a vector variant address map 1416 for vector variants of the "foo1( )" scalar function of the parent class. Further, the virtual function table 1404 includes an entry 1410 for the "foo2( )" function of the parent class, and an entry 1412 for the "foo3( )" function of the parent class.

For another iteration 1422 of the loop, the compute device 100 determines that a pointer in the vector for an instance of the parent class, "class A", actually points to an instance of the child class, "class B". Further, the compute device 100 resolves a pointer ("vtbl_p") to a virtual function table 1424 for the child class (i.e., "class B"). The virtual function table 1424 is extended to include an entry 1426 that points to a vector variant address map 1436 for vector variants of the "foo0( )" scalar function of the child class. In other words, as described above, the child class overrides the "foo0( )" function of the parent class. Additionally, the virtual function table 1424 includes an entry 1428 that points to the vector variant address map 1416 for vector variants of the "foo1( )" scalar function of the parent class. In other words, the child class does not override the "foo1( )" functions of the parent class. Further, the virtual function table 1424 includes an entry 1430 that points to the "foo2( )" function of the parent class, given that the child class does not override this function. Similarly, the virtual function table 1424 includes an entry 1432 that point to the "foo3( )" function of the parent class, given that the child class also does not override this function of the parent class. Further, the virtual function table 1424 includes an entry 1434 that points to a vector variant address map 1440 for vector variants of the "foo4( )" function that is present only in the child class, and is absent from the parent class.

Examples

Illustrative examples of the devices, systems, and methods disclosed herein are provided below. An embodiment of the devices, systems, and methods may include any one or more, and any combination of, the examples described below.

Example 1 includes a compute device for indirectly calling vector functions, the compute device comprising a memory device to store source code; a compiler module to identify, in the source code, declarations of scalar functions; identify, in the source code, a set of declarations of vector variants for each of the scalar functions; generate a vector variant address map for each set of vector variants, wherein each vector variant address map includes addresses of the vector variants of the associated scalar function; generate an offset map for each scalar function, wherein each offset map includes offsets into the associated vector variant address map and each offset is to a different one of the vector variant addresses; identify, in the source code, an indirect call to the scalar functions, wherein the indirect call is to be vectorized; determine, based on a context of the indirect call, a vector variant to be called; and store, in object code and in association with the indirect call, an offset into one of the vector variant address maps based on (i) the determined vector variant to be called and (ii) the offset map that corresponds to each scalar function.

Example 2 includes the subject matter of Example 1, and wherein to generate the vector variant address map comprises to additionally include an address of the associated scalar function in the vector variant address map.

Example 3 includes the subject matter of any of Examples 1 and 2, and wherein to generate the vector variant address map comprises to order the addresses in the vector variant address map based on a predefined layout rule.

Example 4 includes the subject matter of any of Examples 1-3, and wherein to generate the vector variant address map comprises to order the addresses in the vector variant address map based on an alphabetical order of names of the vector variants.

Example 5 includes the subject matter of any of Examples 1-4, and wherein to determine the vector variant to be called comprises to determine the vector variant to be called based on a length of the vector.

Example 6 includes the subject matter of any of Examples 1-5, and wherein to determine the vector variant to be called comprises to determine the vector variant to be called based on a target architecture for the object code.

Example 7 includes the subject matter of any of Examples 1-6, and wherein to determine the vector variant to be called comprises to determine the vector variant based on a value progression pattern.

Example 8 includes the subject matter of any of Examples 1-7, and wherein the compiler module is further to store the vector variant address maps in the object code.

Example 9 includes the subject matter of any of Examples 1-8, and further including an execution module to read the object code generated from the source code; identify, in the object code, the indirect call to be vectorized; determine an address of each associated vector variant, based on (i) the offset stored in association with the indirect call and (ii) the vector variant address map for each vector variant; and execute the vector variants based on the determined addresses.

Example 10 includes the subject matter of any of Examples 1-9, and further including a processor that includes a single instruction, multiple data (SIMD) unit in a core, wherein to execute the vector variants comprises to assign execution of the vector variants to the SIMD unit.

Example 11 includes the subject matter of any of Examples 1-10, and wherein to determine the address of each associated vector variant comprises to access the vector variant address map associated with the vector variant; and read the address stored at the offset within the identified vector variant address map.

Example 12 includes the subject matter of any of Examples 1-11, and wherein the execution module is further to identify the vector variant address map associated with each vector variant by identifying each scalar function associated with the indirect call.

Example 13 includes a method for indirectly calling vector functions, the method comprising identifying, by a compute device, declarations of scalar functions in a source code stored in a memory device of the compute device; identifying, by the compute device, a set of declarations of vector variants for each of the scalar functions in the source code; generating, by the compute device, a vector variant address map for each set of vector variants, wherein each vector variant address map includes addresses of the vector variants of the associated scalar function; generating, by the compute device, an offset map for each scalar function, wherein each offset map includes offsets into the associated vector variant address map and each offset is to a different one of the vector variant addresses; identifying, by the compute device, in the source code, an indirect call to the scalar functions, wherein the indirect call is to be vectorized; determining, by the compute device, based on a context of the indirect call, a vector variant to be called; and storing, by the compute device, in object code and in association with the indirect call, an offset into one of the vector variant address maps based on (i) the determined vector variant to be called and (ii) the offset map that corresponds to each scalar function.

Example 14 includes the subject matter of Example 13, and wherein generating the vector variant address map comprises including an address of the associated scalar function in the vector variant address map.

Example 15 includes the subject matter of any of Examples 13 and 14, and wherein generating the vector variant address map comprises ordering the addresses in the vector variant address map based on a predefined layout rule.

Example 16 includes the subject matter of any of Examples 13-15, and wherein generating the vector variant address map comprises ordering the addresses in the vector variant address map based on an alphabetical order of names of the vector variants.

Example 17 includes the subject matter of any of Examples 13-16, and wherein determining the vector variant to be called comprises determining the vector variant to be called based on a length of the vector.

Example 18 includes the subject matter of any of Examples 13-17, and wherein determining the vector variant to be called comprises determining the vector variant to be called based on a target architecture for the object code.

Example 19 includes the subject matter of any of Examples 13-18, and wherein determining the vector variant to be called comprises determining the vector variant based on a value progression pattern.

Example 20 includes the subject matter of any of Examples 13-19, and further including storing, by the compute device, the vector variant address maps in the object code.

Example 21 includes the subject matter of any of Examples 13-20, and further including reading, by the compute device, the object code generated from the source code; identifying, by the compute device, in the object code, the indirect call to be vectorized; determining, by the compute device, an address of each associated vector variant, based on (i) the offset stored in association with the indirect call and (ii) the vector variant address map for each vector variant; and executing, by the compute device, the vector variants based on the determined addresses.

Example 22 includes the subject matter of any of Examples 13-21, and wherein executing the vector variants comprises assigning execution of the vector variants to a single instruction, multiple data (SIMD) unit of a core of a processor in the compute device.

Example 23 includes the subject matter of any of Examples 13-22, and wherein determining the address of each associated vector variant comprises accessing the vector variant address map associated with the vector variant; and reading the address stored at the offset within the identified vector variant address map.

Example 24 includes the subject matter of any of Examples 13-23, and further including identifying the vector variant address map associated with each vector variant by identifying each scalar function associated with the indirect call.

Example 25 includes one or more computer-readable storage media comprising a plurality of instructions that, when executed, cause a compute device to perform the method of any of Examples 13-24.

Example 26 includes a compute device for indirectly calling vector functions, the compute device comprising means for identifying declarations of scalar functions in a source code stored in a memory device of the compute device; means for identifying a set of declarations of vector variants for each of the scalar functions in the source code; means for generating a vector variant address map for each set of vector variants, wherein each vector variant address map includes addresses of the vector variants of the associated scalar function; means for generating an offset map for each scalar function, wherein each offset map includes offsets into the associated vector variant address map and each offset is to a different one of the vector variant addresses; means for identifying in the source code, an indirect call to the scalar functions, wherein the indirect call is to be vectorized; means for determining based on a context of the indirect call, a vector variant to be called; and means for storing in object code and in association with the indirect call, an offset into one of the vector variant address maps based on (i) the determined vector variant to be called and (ii) the offset map that corresponds to each scalar function.

Example 27 includes the subject matter of Example 26, and wherein the means for generating the vector variant address map comprises means for including an address of the associated scalar function in the vector variant address map.

Example 28 includes the subject matter of any of Examples 26 and 27, and wherein the means for generating the vector variant address map comprises means for ordering the addresses in the vector variant address map based on a predefined layout rule.

Example 29 includes the subject matter of any of Examples 26-28, and wherein the means for generating the vector variant address map comprises means for ordering the addresses in the vector variant address map based on an alphabetical order of names of the vector variants.

Example 30 includes the subject matter of any of Examples 26-29, and wherein the means for determining the vector variant to be called comprises means for determining the vector variant to be called based on a length of the vector.

Example 31 includes the subject matter of any of Examples 26-30, and wherein the means for determining the vector variant to be called comprises means for determining the vector variant to be called based on a target architecture for the object code.

Example 32 includes the subject matter of any of Examples 26-31, and wherein the means for determining the vector variant to be called comprises means for determining the vector variant based on a value progression pattern.

Example 33 includes the subject matter of any of Examples 26-32, and further including means for storing the vector variant address maps in the object code.

Example 34 includes the subject matter of any of Examples 26-33, and further including means for reading the object code generated from the source code; means for identifying in the object code, the indirect call to be vectorized; means for determining an address of each associated vector variant, based on (i) the offset stored in association with the indirect call and (ii) the vector variant address map for each vector variant; and means for executing the vector variants based on the determined addresses.

Example 35 includes the subject matter of any of Examples 26-34, and wherein the means for executing the vector variants comprises means for assigning execution of the vector variants to a single instruction, multiple data (SIMD) unit of a core of a processor in the compute device.

Example 36 includes the subject matter of any of Examples 26-35, and wherein the means for determining the address of each associated vector variant comprises means for accessing the vector variant address map associated with the vector variant; and means for reading the address stored at the offset within the identified vector variant address map.

Example 37 includes the subject matter of any of Examples 26-36, and further including means for identifying the vector variant address map associated with each vector variant by identifying each scalar function associated with the indirect call.

The invention claimed is:

1. A compute device for indirectly calling vector functions, the compute device comprising:
a memory device to store source code;
a compiler module to:
identify, in the source code, declarations of scalar functions;
identify, in the source code, a set of declarations of vector variants for each of the scalar functions;
generate a vector variant address map for each set of vector variants, wherein each vector variant address map includes addresses of the vector variants of the associated scalar function;
generate an offset map for each scalar function, wherein each offset map includes offsets into the associated vector variant address map and each offset is to a different one of the vector variant addresses;
identify, in the source code, an indirect call to the scalar functions, wherein the indirect call is to be vectorized;
determine, based on a context of the indirect call, a vector variant to be called; and
store, in object code and in association with the indirect call, an offset into one of the vector variant address maps based on (i) the determined vector variant to be called and (ii) the offset map that corresponds to each scalar function.

2. The compute device of claim 1, wherein to generate the vector variant address map comprises to additionally include an address of the associated scalar function in the vector variant address map.

3. The compute device of claim 1, wherein to generate the vector variant address map comprises to order the addresses in the vector variant address map based on a predefined layout rule.

4. The compute device of claim 1, wherein to generate the vector variant address map comprises to order the addresses in the vector variant address map based on an alphabetical order of names of the vector variants.

5. The compute device of claim 1, wherein to determine the vector variant to be called comprises to determine the vector variant to be called based on a length of the vector.

6. The compute device of claim 1, wherein to determine the vector variant to be called comprises to determine the vector variant to be called based on a target architecture for the object code.

7. The compute device of claim 1, wherein to determine the vector variant to be called comprises to determine the vector variant based on a value progression pattern.

8. The compute device of claim 1, wherein the compiler module is further to store the vector variant address maps in the object code.

9. The compute device of claim 1, further comprising an execution module to:
read the object code generated from the source code;
identify, in the object code, the indirect call to be vectorized;
determine an address of each associated vector variant, based on (i) the offset stored in association with the indirect call and (ii) the vector variant address map for each vector variant; and
execute the vector variants based on the determined addresses.

10. One or more non-transitory, computer-readable storage media comprising a plurality of instructions that, when executed, cause a compute device to:
identify declarations of scalar functions in a source code stored in a memory device of the compute device;

identify a set of declarations of vector variants for each of the scalar functions in the source code;

generate a vector variant address map for each set of vector variants, wherein each vector variant address map includes addresses of the vector variants of the associated scalar function;

generate an offset map for each scalar function, wherein each offset map includes offsets into the associated vector variant address map and each offset is to a different one of the vector variant addresses;

identify in the source code, an indirect call to the scalar functions, wherein the indirect call is to be vectorized;

determine, based on a context of the indirect call, a vector variant to be called; and store, in object code and in association with the indirect call, an offset into one of the vector variant address maps based on (i) the determined vector variant to be called and (ii) the offset map that corresponds to each scalar function.

11. The one or more non-transitory, computer-readable storage media of claim 10, wherein to generate the vector variant address map comprises to include an address of the associated scalar function in the vector variant address map.

12. The one or more non-transitory, computer-readable storage media of claim 10, wherein to generate the vector variant address map comprises to order the addresses in the vector variant address map based on a predefined layout rule.

13. The one or more non-transitory, computer-readable storage media of claim 10, wherein to generate the vector variant address map comprises to order the addresses in the vector variant address map based on an alphabetical order of names of the vector variants.

14. The one or more non-transitory, computer-readable storage media of claim 10, wherein to determine the vector variant to be called comprises to determine the vector variant to be called based on a length of the vector.

15. The one or more non-transitory, computer-readable storage media of claim 10, wherein to determine the vector variant to be called comprises to determine the vector variant to be called based on a target architecture for the object code.

16. The one or more non-transitory, computer-readable storage media of claim 10, wherein to determining the vector variant to be called comprises to determine the vector variant based on a value progression pattern.

17. The one or more non-transitory, computer-readable storage media of claim 10, further comprising instructions that, when executed, cause the compute device to store the vector variant address maps in the object code.

18. A method for indirectly calling vector functions, the method comprising:

identifying, by a compute device, declarations of scalar functions in a source code stored in a memory device of the compute device;

identifying, by the compute device, a set of declarations of vector variants for each of the scalar functions in the source code;

generating, by the compute device, a vector variant address map for each set of vector variants, wherein each vector variant address map includes addresses of the vector variants of the associated scalar function;

generating, by the compute device, an offset map for each scalar function, wherein each offset map includes offsets into the associated vector variant address map and each offset is to a different one of the vector variant addresses;

identifying, by the compute device, in the source code, an indirect call to the scalar functions, wherein the indirect call is to be vectorized;

determining, by the compute device, based on a context of the indirect call, a vector variant to be called; and storing, by the compute device, in object code and in association with the indirect call, an offset into one of the vector variant address maps based on (i) the determined vector variant to be called and (ii) the offset map that corresponds to each scalar function.

19. The method of claim 18, wherein generating the vector variant address map comprises including an address of the associated scalar function in the vector variant address map.

20. The method of claim 18, wherein generating the vector variant address map comprises ordering the addresses in the vector variant address map based on a predefined layout rule.

21. The method of claim 18, wherein generating the vector variant address map comprises ordering the addresses in the vector variant address map based on an alphabetical order of names of the vector variants.

22. The method of claim 18, wherein determining the vector variant to be called comprises determining the vector variant to be called based on a length of the vector.

23. The method of claim 18, wherein determining the vector variant to be called comprises determining the vector variant to be called based on a target architecture for the object code.

24. The method of claim 18, wherein determining the vector variant to be called comprises determining the vector variant based on a value progression pattern.

25. The method of claim 18, further comprising storing, by the compute device, the vector variant address maps in the object code.

* * * * *